United States Patent Office 2,729,198
Patented Jan. 3, 1956

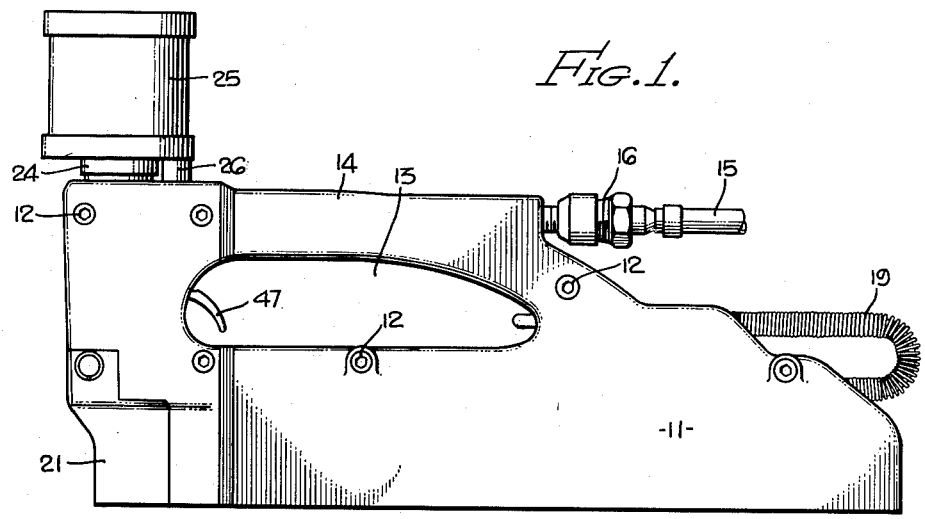
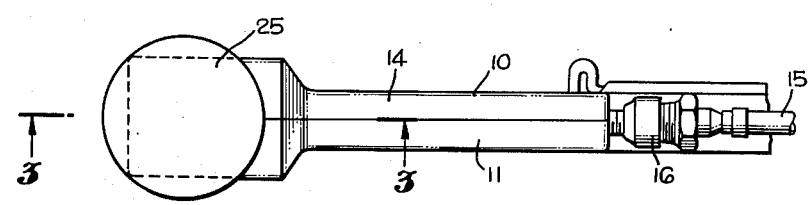
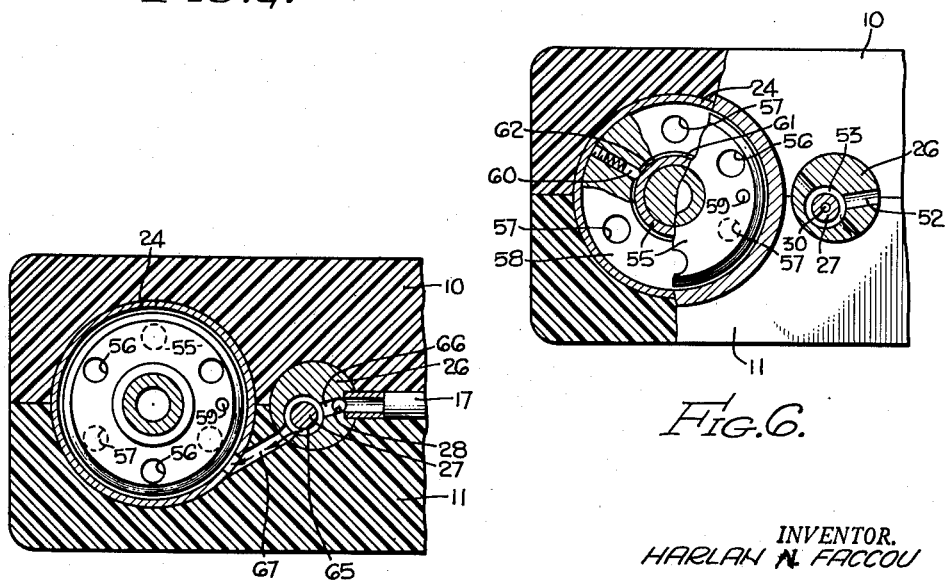

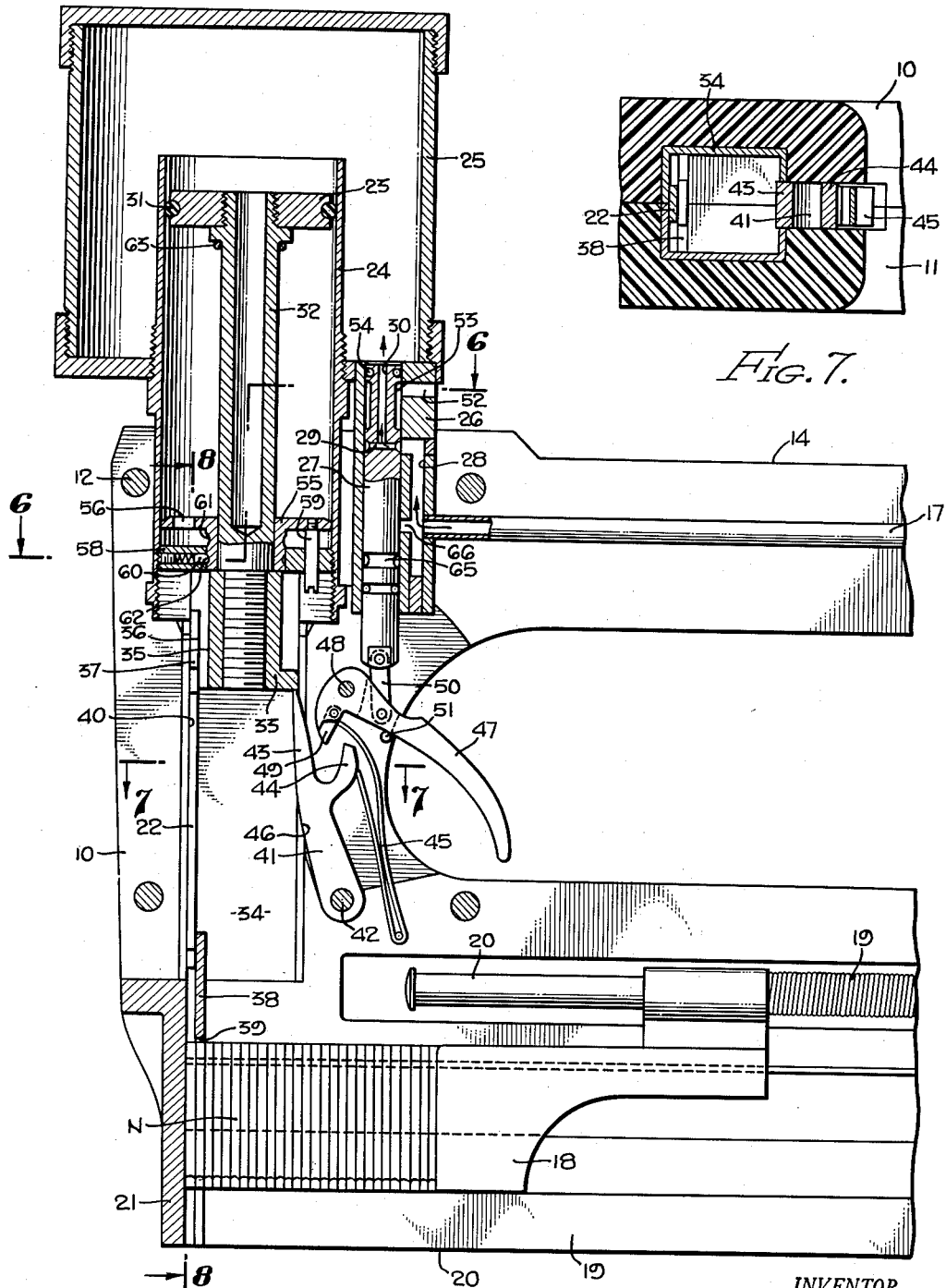

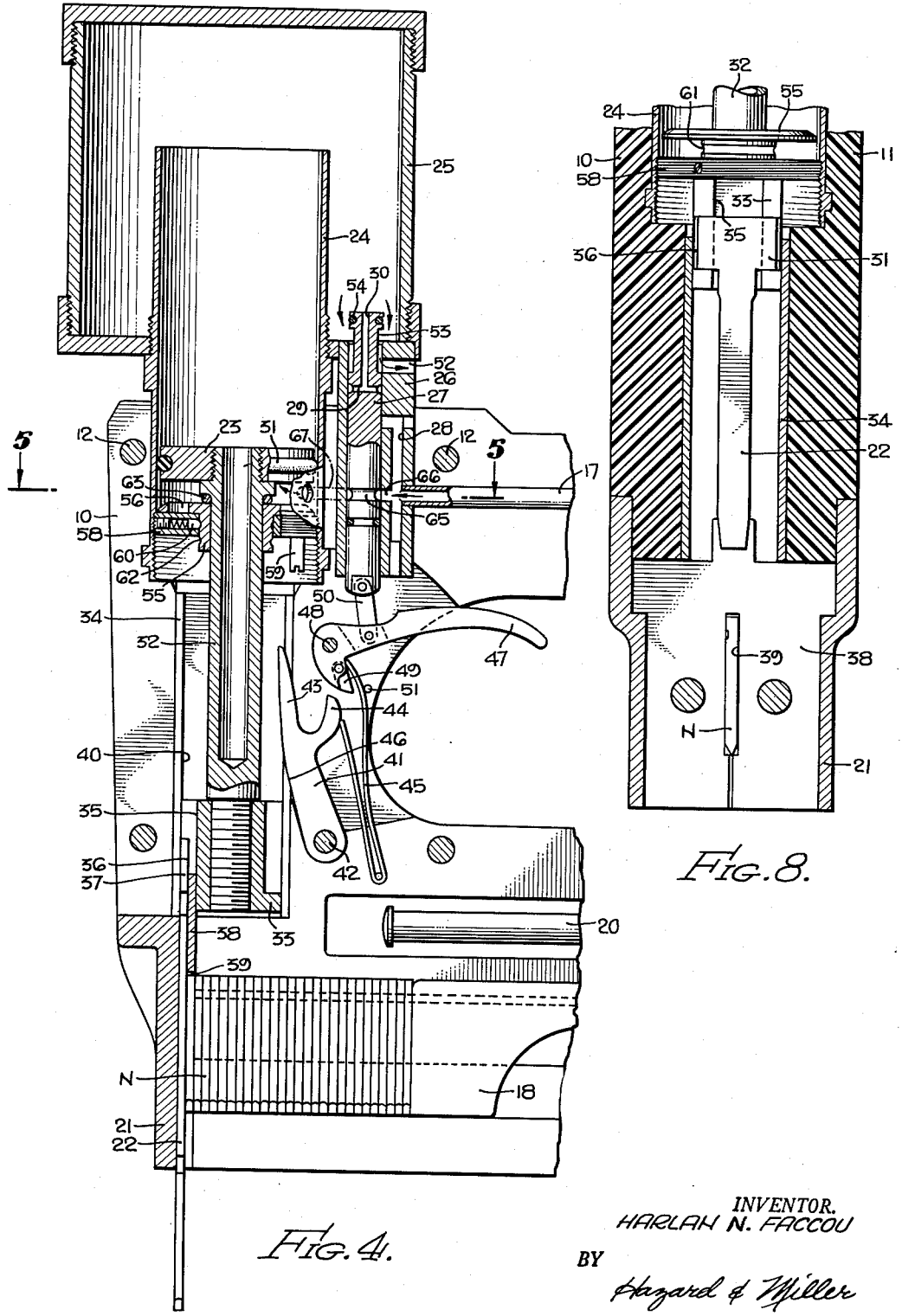

2,729,198
PNEUMATIC NAILER
Harlan N. Faccou, Santa Ana, Calif.
Application November 27, 1951, Serial No. 258,435
5 Claims. (Cl. 121—3)

This invention relates to a pneumatic nailer.

A primary object of the invention is to provide a manually portable device adapted to be connected, such as by a hose, to a supply of fluid pressure such as compressed air and which will, on the actuation of the trigger of the device, cause a nail to be pneumatically driven from a magazine contained in the device in which there is disposed a supply of nails.

More specifically, an object of the invention is to provide a pneumatic nailer in which there is a piston-operated driver utilized to drive the nails consecutively and wherein there is a reservoir in communication with the cylinder for the piston which is materially greater in volumetric size than the piston displacement. In devices of this character wherein a pressure-operated piston is used to drive a nail or similar fastening device the fluid pressure, if largely confined in the cylinder over the piston, quickly loses its effective pressure as the piston proceeds on its driving stroke. Thus, if the pressure is confined entirely within the cylinder over the piston within a certain volume and the piston proceeds on its driving stroke so that the confined pressure doubles its volume, the pressure is halved. To avoid this quick reduction in pressure effective on the piston as it proceeds on its driving stroke there is provided a reservoir which volumetrically is materially greater than the piston displacement within its cylinder so that although the volume may increase as the piston proceeds on its driving stroke, the loss in pressure is relatively small. Consequently, the piston as it approaches the end of its driving stroke will have a large fraction of the initial pressure still effective thereon so as to satisfactorily drive the nail.

Another object of the invention is to provide a pneumatic nailer having the above-mentioned characteristics wherein an outlet is provided from the bottom of the cylinder so that air therein beneath the piston may be freely expelled as the piston proceeds on its driving stroke and as the piston approaches the end of its driving stroke the outlet will be automatically closed. The reservoir is simultaneously open to atmosphere to reduce the pressure therein and fluid pressure from the source of supply is diverted from the reservoir to beneath the piston so as to return the piston and its driver to its initial position after which the reservoir is recharged.

Another object of the invention is to provide a pneumatic nailer, parts of which are comparatively simply and ruggedly constructed, thus enabling economical manufacture and easy repair and promoting long and useful life of the device.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the pneumatic nailer embodying the present invention;

Fig. 2 is a top plan view of the nailer;

Fig. 3 is a conventionalized vertical section on an enlarged scale taken substantially upon the line 3—3 upon Fig. 2, the piston being shown in its uppermost or initial position;

Fig. 4 is a view similar to Fig. 3, but illustrating the piston and its driver at the end of its driving stroke;

Fig. 5 is a partial view in horizontal section taken substantially upon the line 5—5 upon Fig. 4 in the direction indicated;

Fig. 6 is a partial view in horizontal section taken substantially upon the line 6—6 upon Fig. 3 in the direction indicated;

Fig. 7 is a partial view in horizontal section taken substantially upon the line 7—7 upon Fig. 3; and Fig. 8 is a vertical section taken substantially upon the line 8—8 upon Fig. 3.

Referring to the accompanying drawings wherein similar reference characters designate similar parts throughout, the improved pneumatic nailer consists of a body largely composed of two opposed parts indicated at 10 and 11 secured together such as by bolts or the equivalent indicated at 12. These parts are preferably formed of Bakelite or equivalent material supplying adequate strength as well as being relatively light although any other suitable material may be employed if so desired.

The two parts 10 and 11 have aligned openings 13 providing a handle 14 by which the device may be manually transported from place to place in the course of driving nails. The device is supplied with fluid pressure such as compressed air from a suitable source of supply through a flexible hose 15 which is detachably connected as by a coupling 16 to a tube 17 that is recessed in the parts 10 and 11.

In the base portions of the body parts 10 and 11 there is provided a suitable magazine adapted to receive a series of nails, pins, or similar fasteners indicated at N. These fasteners may be of any conventional or preferred type or may even be staples or equivalent fasteners. A type of fastener for which the machine of the present invention is especially adapted comprises a series of pins in side by side or "stick" relationship temporarily and weakly held or adhered together as a unit to facilitate their being positioned in the magazine.

A follower 18 is slidable in the magazine and is actuated by a compression spring 19 trained over a pusher guiding rod 20 to urge the pins N against a plate 21 mounted on the forward end of the body. The forwardmost fastener of the group is thus positioned vertically beneath a driver indicated at 22 that is forced downwardly by means of a piston 23 so that the forwardmost pin may be broken loose from the group and driven downwardly into the material that is to be fastened, as indicated in Fig. 4. When the piston and the driver return to their initial positions shown in Fig. 3, the follower 18 urges the group of pins N forwardly, positioning the next succeeding pin against the plate 21 and in the path of the driver 22.

The piston 23 is reciprocable in a cylinder 24, the top of which is open to and in communication with the interior of a reservoir 25. The reservoir 25 volumetrically is materially larger than the piston displacement of the piston 23 within its cylinder 24 and is preferably at least double the piston displacement. While the reservoir might be provided by merely elongating the upper end of the cylinder, such a construction would be apt to be cumbersome and therefore it is preferably arranged concentrically around and over the cylinder as illustrated. In the bottom of the reservoir 25 near the handle 14 there is pressed or otherwise secured a valve housing 26 within which there is a vertically reciprocable valve member 27. The valve housing has an inlet port 28 that is in communication with the tube 17 so as to receive compressed air therefrom. This port is normally in registration with a diametrical hole 29 extending through the valve member 27 and this hole, in turn, is in communication with an axial bore 30 in the top of the valve member. Consequently, when the device is in position shown in Fig. 3, compressed air in the tube 17 may flow through the port 28, the hole 29, and the bore 30 into the reservoir 25 to charge the reservoir with compressed air, the pressure of which is effective on the top of the piston 23 to urge the piston downwardly.

The piston is equipped with suitable packing such as indicated by the O-ring 31 and carries a piston rod 32. This piston rod is preferably hollowed out, as indicated, in the interests of lightness as it is desirable to have the piston and piston rod as light as possible and still have adequate strength. On the bottom of the piston rod 32 there is screwed a bushing or crosshead 33 which is slidable within a tubular guide 34 see Fig. 3. This guide has on its forward face a vertical milled groove 35 see Fig. 8 and a horizontally milled groove 36. The vertically milled groove 35 is somewhat deeper than the horizontally milled groove 36 and the ends of the horizontally milled groove 36 are designed to accommodate the ends 37 of the driver 22 so that as the piston and piston rod descend, the crosshead 33 mounted on the piston rod will force the driver 22 downwardly.

A plate 38 has an opening 39 therein which defines the forward end of the magazine, and this plate has a short vertical extension extending upwardly behind the tip portion, Fig. 8, of the driver 22. This extension merely slides through the vertical groove 35 as the crosshead 33 descends to the end of its driving stroke and cooperates with an opposed face 40 and the cover 21 to form a guide for the driver 22.

The piston 23, the piston rod 32, the crosshead 33 and the driver 22 are releasably held in their uppermost positions despite the presence of fluid pressure in the reservoir 25 by means of a sear 41 pivoted between the members 10 and 11 on a pivot pin 42. An opening is provided in the back of the guide 34 through which a finger 43 on the sear may partially extend so as to assume a position beneath the crosshead. When in this position the sear serves to releasably hold the crosshead and consequently the piston in their initial or retracted positions. The sear carries a thumb 44 engaged by a spring 45 to urge the sear into the position beneath the crosshead. Its forward swinging movement is limited by its engagement with the bottom of the opening in the guide 34 which is indicated at 46. A trigger 47 is provided which extends into the hand opening 13. This trigger is pivoted at 48 and carries a pawl 49 also urged into a predetermined position with relation to the trigger by means of the spring 45. When the trigger 47 is actuated it causes the pawl 49 to engage the thumb 44 and to swing the sear 41 in a clockwise direction from the position shown in Fig. 3. When the finger 43 passes from beneath the crosshead 33 the piston 23 and its associated structure are free to descend under the influence of the pressure existing in the reservoir 25. As the trigger 47 continues its movement the pawl 49 will eventually clear the thumb 44 allowing the sear 41 to return to its position as shown in Fig. 4. When the trigger is released it will return to the position shown in Fig. 3, and in so doing the pivoted pawl 49 merely passes over the end of the thumb 44.

The trigger 47 is connected to the valve member 27 by means of a link 50 and downward swinging movement of the trigger is limited by means of a stop pin 51. The valve housing is equipped with an exhaust port 52 near its top and the upper end of the valve member 27 is externally grooved as at 53. Above the groove 53 the valve member is provided with a sealing ring such as an O-ring 54. When the trigger is actuated to cause the sear 41 to release the crosshead 33, this movement of the trigger also involves an upward movement of the valve member 27. As soon as the groove 53 reaches the top of the valve housing 26 it provides communication between the reservoir 25 and the exhaust port 52. This occurs, however, a short time after the sear 41 has released the crosshead 33 for its driving stroke. In this manner, although fluid pressure is initially confined in the reservoir 25 to drive the piston 23 downwardly, immediately after the piston makes its downward stroke, the groove 53 serves to exhaust the reservoir or release the pressure therein to atmosphere through the exhaust port 52.

The lower end of the piston rod 32 immediately above the bushing or crosshead 33 is equipped with a flanged bushing 55 which has one or more apertures 56 therein. These apertures are disposed out of alignment with apertures 57 that are formed in a closure 58 that closes the bottom of the cylinder 24. The bushing 55 is held against rotation by means of a pin 59 secured thereto which slidably extends through an aperture in the closure 58. A spring-actuated detent 60 is adapted to enter either of the two circumferential grooves 61 and 62 on the hub of the bushing 55 to hold the bushing in its uppermost position as depicted in Fig. 3, until forcibly displaced from that position into the position shown in Fig. 4. Then, the detent serves to hold the bushing in that position until forcibly displaced therefrom.

On the piston rod 32 adjacent its upper end there is a shoulder against which there is positioned an O-ring 63 which functions merely as a bumper. As the piston rod descends within the cylinder 24 there is, of course, air in the cylinder beneath the piston. This air can find egress through the apertures 56 and apertures 57 as well as the flange of the bushing which is spaced from the closure 58 as depicted in Fig. 3. As the piston 23 approaches the bottom of its stroke the bumper ring 63 engages the bushing 55 and forces the bushing downwardly through the closure 58, the detent 60 passing from the groove 62 to the groove 61. In this position, as depicted in Fig. 4, the flange of the bushing lies directly against the closure 58 and as the apertures 56 and 57 are misaligned, the bottom of the cylinder 24 is effectively closed.

Near the lower end of the valve member 27 there is a circumferential groove 65 which, when the trigger is in its uppermost position, provides communication between a port 66 in the valve housing and a port 67 formed in the part 11 which communicates with the interior of the cylinder 24 beneath the piston 23 when the piston is in its lowermost position. Consequently, when the device is in the position shown in Fig. 4, further supply of compressed air from the tube 17 to the reservoir 25 is effectively cut off and is diverted through the port 66, groove 65, and port 67 to the interior of the cylinder 24 beneath the piston. The fluid pressure thus supplied to the under side of the piston serves to return the piston from its lowermost position shown in Fig. 4 to its retracted or initial position shown in Fig. 3. As the piston reaches the top of its stroke the crosshead 33 engages the bottom of the hub of the bushing 55 and returns it to the position shown in Fig. 3, wherein it is held by the detent 60. The bottom of the cylinder is thus opened so that air in the cylinder may be expelled therefrom beneath the piston during the next succeeding driving stroke of the piston.

From the above-described construction it will be appreciated that when the magazine has been loaded and compressed air is supplied to the device through the hose 15, the reservoir 25 will be charged with fluid pressure that is effective on the piston 23. When the trigger 47 is actuated it causes the sear 41 to release the piston and its associated structure for downward or driving movement thus driving the forwardmost fastener. The continued movement of the trigger 47 causes the valve member 27 to shut off the supply of fluid pressure to the reservoir and to place the interior of the reservoir 25 in communication with atmosphere through the groove 53 and the port 52. At the same time compressed air is diverted through port 66, groove 65, and port 67 to the bottom of the cylinder which has been closed by the bumper ring 63 shifting the bushing 55 to closed position Fig. 4. Fluid pressure thus admitted to the bottom of the cylinder serves to return the piston and its associated structure to its initial or retracted position and on reaching its initial position the bottom of the cylinder is again opened. When the trigger is released the spring 45 returns it to its initial position shown in Fig. 3 and the valve member 27 consequently descends to the position shown in that figure. Supply of compressed air to the bottom of the cylinder is consequently cut off and is carried through the port 28, aperture 29, and bore 30 to the reservoir to recharge the reservoir with compressed air. As above explained, inasmuch as the reservoir holds a volume of compressed air materially larger than the displacement of the piston 23 within its cylinder 24, there is only a small loss in pressure effective on top of the piston as the piston proceeds downwardly in its driving stroke.

It will be appreciated that the above-described construction is relatively simple and that the parts thereof may be easily and economically manufactured and assembled. As the design is relatively rugged there is little opportunity for parts to become worn or broken and when this occurs repair or replacement is easily accomplished on merely separating the parts of the body by the removal of the screws or bolts 12.

Various changes may be made in the details of construction without departing from the spirit and scope of the invention as defined by the appended claims.

I claim:

1. In a pneumatic nailer, a driver for driving nails to be driven, a piston connected thereto, a cylinder in which the piston is reciprocable, a reservoir surrounding one end of the cylinder and with which the cylinder communicates, said reservoir being of volumetric capacity materially greater than the displacement of the piston in the cylinder, a sear engageable with the piston for holding it in retracted position, a trigger engageable with the sear for causing the sear to release the piston, a supply source of compressed air, means including a valve operable by the trigger for connecting the supply source of compressed air to the reservoir while the sear is holding the piston in retracted position and for shutting off the supply of compressed air to the reservoir and opening the reservoir to atmosphere when the trigger is actuated to cause the sear to release the piston.

2. In a pneumatic nailer, a driver for driving nails to be driven, a piston connected thereto, a cylinder in which the piston is reciprocable, valve means at one end of the cylinder openable by the piston when the piston approaches the end of its retracting movement and closable by the piston as the piston approaches the end of its advancing movement, a reservoir in communication with the other end of the cylinder having a volumetric capacity materially greater than the piston displacement within the cylinder, a sear engageable with the piston for releasably holding the piston in retracted position, a trigger engageable with the sear for causing the sear to release the piston, a supply source of compressed air, and valve means connected to the trigger and operable thereby to normally connect the compressed air source to the reservoir when the trigger permits the sear to hold the piston in retracted position but when the trigger is actuated to cause the sear to release the piston to shut off the supply of compressed air to the reservoir, open the reservoir to atmosphere, and connect the compressed air source to the cylinder between the piston and the first mentioned valve means whereby, upon actuation of the piston following its release by the sear, the piston and driver may be returned to their retracted positions.

3. In a pneumatic nailer, a driver for driving nails to be driven, a piston connected thereto, a cylinder in which the piston is reciprocable, valve means at one end of the cylinder operable by the piston when the piston approaches the end of its retracting movement and closable by the piston as the piston approaches the end of its advancing movement, a reservoir in communication with the other end of the cylinder having a volumetric capacity materially greater than the piston displacement within the cylinder, a sear engageable with the piston for releasably holding the piston in retracted position, a trigger engageable with the sear for causing the sear to release the piston, a supply source of compressed air, valve means connected to the trigger and operable thereby to normally connect the compressed air source to the reservoir when the trigger permits the sear to hold the piston in retracted position but when the trigger is actuated to cause the sear to release the piston to shut off the supply of compressed air to the reservoir, open the reservoir to atmosphere, and connect the compressed air source to the cylinder between the piston and the first mentioned valve means whereby, upon actuation of the piston following its release by the sear, the piston and driver may be returned to their retracted positions, and spring means urging the sear into its piston-retaining position and the trigger into its normal position wherein the valve means connects the compressed air source to the reservoir and the outlet from the reservoir to atmosphere is closed.

4. In a pneumatic nailer, a driver for driving nails to be driven, a piston connected thereto, a cylinder in which the piston is reciprocable, valve means at one end of the cylinder openable by the piston when the piston approaches the end of its retracting movement and closable by the piston as the piston approaches the end of its advancing movement, a reservoir surrounding the other end of the cylinder and in communication therewith having a volumetric capacity materially greater than the piston displacement, a sear engageable with the piston for releasably holding the piston in retracted position, a trigger engageable with the sear for causing the sear to release the piston, a supply source of compressed air, and valve means connected to the trigger and operable thereby to normally connect the compressed air source to the reservoir when the trigger permits the sear to hold the piston in retracted position but when the trigger is actuated to cause the sear to release the piston to shut off the supply of compressed air to the reservoir, open the reservoir to atmosphere and connect the compressed air source to the cylinder between the piston and the first mentioned valve means whereby, upon actuation of the piston following its release by the sear, the piston and driver may be returned to their retracted positions.

5. In a pneumatic nailer, a driver for driving nails to be driven, a piston connected thereto, a cylinder in which the piston is reciprocable, valve means at one end of the cylinder openable by the piston when the piston approaches the end of its retracting movement and closeable by the piston as the piston approaches the end of its advancing movement, a reservoir surrounding the other end of the cylinder and in communication therewith having a volumetric capacity materially greater than the piston displacement, a sear engageable with the piston for releasably holding the piston in retracted position, a trigger engageable with the sear for causing the sear to release the piston, a supply source of compressed air, valve means connected to the trigger and operable thereby to normally connect the compressed air source to the reservoir when the trigger permits the sear to hold the piston in retracted position but when the trigger is actuated to cause the sear to release the piston to shut off the supply of compressed air to the reservoir, open the reservoir to atmosphere and connect the compressed air source to the cylinder between the piston and the first mentioned valve means whereby, upon actuation of the piston following its release by the sear, the piston and driver may be returned to their retracted position, and spring means urging the sear into its piston-retaining position and the trigger into its normal position whereby the valve means connects the compressed air source to the reservoir and the outlet from the reservoir to atmosphere is closed.

References Cited in the file of this patent

UNITED STATES PATENTS

| | | |
|---|---|---|
| 451,995 | Bradeen | May 12, 1891 |
| 562,518 | Ferguson | June 23, 1896 |
| 958,002 | Phelan | May 17, 1910 |
| 1,014,639 | Colwell | Jan. 16, 1912 |
| 1,753,499 | Burger | Apr. 8, 1930 |
| 2,241,184 | Clark | May 6, 1941 |
| 2,257,267 | Lundgren et al. | Sept. 30, 1941 |